United States Patent [19]

Pere

[11] 4,273,641
[45] Jun. 16, 1981

[54] IMPROVEMENTS IN ELECTROLYZERS

[75] Inventor: Gérard Pere, Le Breuil, France

[73] Assignee: Creusot-Loire, Paris, France

[21] Appl. No.: 117,652

[22] Filed: Feb. 1, 1980

[30] Foreign Application Priority Data

Jul. 2, 1979 [FR] France ............................. 79 03796

[51] Int. Cl.³ .............................................. C25B 9/00
[52] U.S. Cl. .................................... 204/253; 204/267; 204/279
[58] Field of Search ............................. 204/253–258, 204/263–266, 267–270, 279, 129; 269/23

[56] References Cited

U.S. PATENT DOCUMENTS

| 2,012,046 | 8/1935 | Jewett | 204/256 X |
| 2,143,793 | 1/1939 | Niederreither | 204/254 |
| 4,064,032 | 12/1977 | Bouy et al. | 204/268 X |
| 4,077,863 | 3/1978 | Nasser | 204/270 X |

FOREIGN PATENT DOCUMENTS 2394620  2/1979  France ........................................ 204/258

Primary Examiner—Donald R. Valentine
Attorney, Agent, or Firm—Haseltine and Lake

[57] ABSTRACT

An electrolyzer consisting of a stack of elemental electrolytic cells held between two end plates connected by tie rods.

Each tie rod (9) is associated with a hydraulic jack (20) enabling variable tightening by remote control. A displacement pick-up (16) and a pressure pick-up (17) supply signals (25,26) to a force and position control cabinet (18).

The invention is made use of in the production of hydrogen and oxygen by electrolysis of water.

2 Claims, 4 Drawing Figures

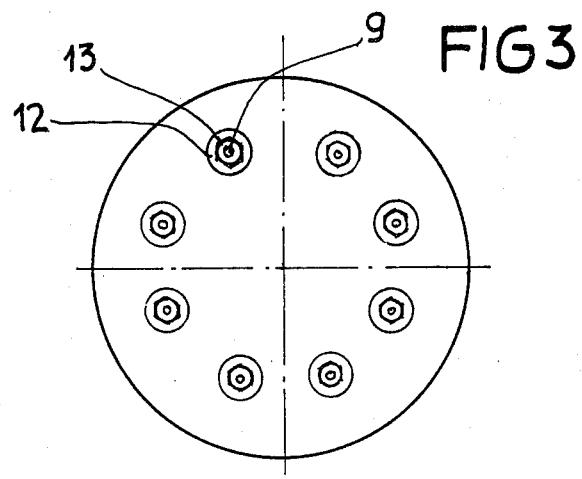
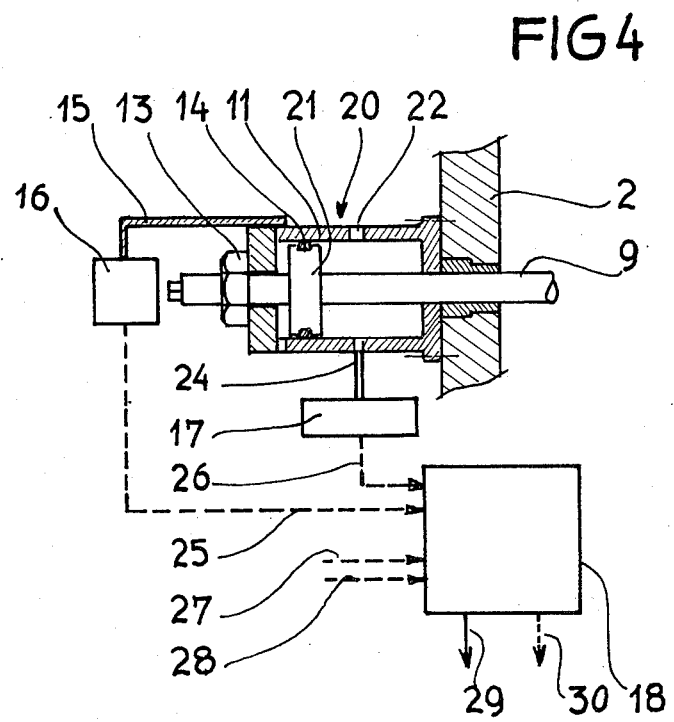

IMPROVEMENTS IN ELECTROLYZERS

FIELD OF THE INVENTION

The present invention refers to an improvement in electrolyzers of the type consisting of a stack of elemental electrolytic cells.

BACKGROUND

Industrial electrolyzers such as those intended for the production of hydrogen and oxygen by the electrolysis of water are formed of a stack of a very large number of elemental electrolytic cells, this stack being held between two end plates by tie rods, and the whole being generally placed in an enclosure the inside of which is pressurized and brought up to a high temperature.

In order to avoid on the one hand leakage through the seals between the cells in the event of insufficient tightening of the tie rods, and on the other hand flow of these seals in the event of excessive tightening, it is necessary to exert upon each tie rod adequate tightening, neither too light nor too heavy. Furthermore in order to avoid an opening at the level of the seals it is necessary to keep the two end plates quite parallel and therefore consequently to have uniform tightening of the whole of the tie rods.

SUMMARY OF THE INVENTION

The electrolyzer of the invention enables these two functions to be ensured. It is characterized in that each of the tie rods includes a device for variable tightening which is remote-controlled and equipped with a device for measurement of the said tightening, and in that the whole of the said devices are connected to a common force and position control cabinet.

BRIEF DESCRIPTION OF THE DRAWINGS

The invention will be better understood by means of the following description of an embodiment by reference to the attached drawings in which:

FIG. 3 is in a diagrammatic view in the direction F as FIG. 1;

FIG. 4 shows the measuring devices associated with one of the tightening devices in accordance with the invention, as well as their connections to the common control cabinet in accordance with the invention.

DETAILED DESCRIPTION

Figure 1:
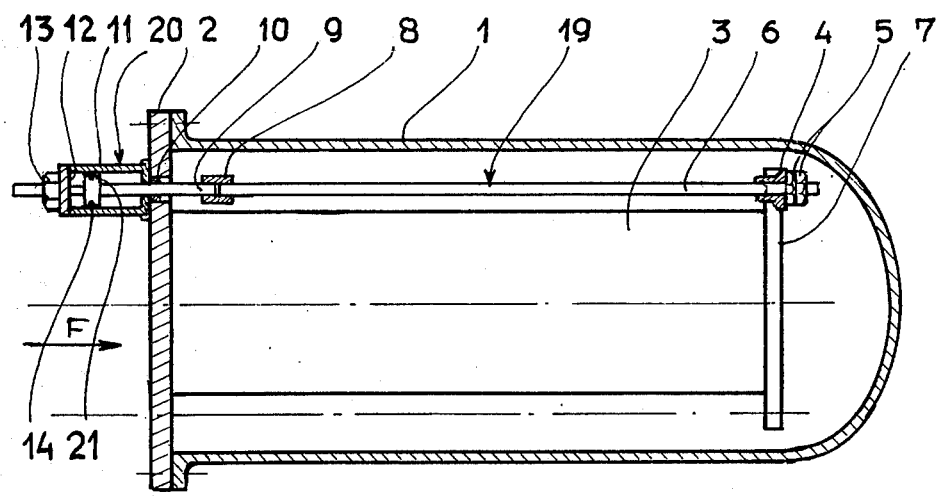
FIG. 1 is a diagrammatic overall view of the electrolyzer in accordance with the invention.
Figure 2:
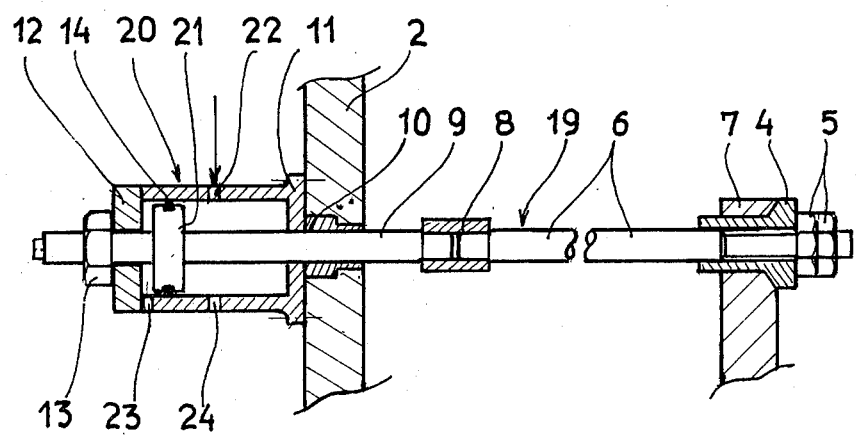
FIG. 2 shows the detail of one of the tie rod tightening devices in accordance with the invention.

In FIG. 1 may be seen an industrial electrolyzer consisting of a stack 3 of a large number (which may run up to several thousand) of elemental electrolytic cells. Conventionally the stack 3 is held in place between a base plate 2 and an end plate 7 by a certain number of tie rods 19, of which only one has been represented on the drawing but which is the example being considered are eight in number as may be seen in FIG. 3. Furthermore the stack 3 is enclosed in a cylindrical envelope 1 which forms with the base plate 2 an electrolyzer enclosure, normally pressurized during the course of operation. As may be seen in FIG. 1 and in greater detail in FIG. 2, each tie rod 19 consists of two rods 6 and 9 assembled by a sleeve 8. At its downstream each tie rod is fixed to the end plate 7 through a spacer 4 by a group 5 of nut and locknut. On the other hand at its upstream portion each tie rod is fixed to the base plate 2 and through a spacer 10 to a hydraulic traction jack 20, a bulge 21 in the rod 9 of which forms the piston.

The jack 20 includes a body 11, a closure plate 12, an inlet 22 for hydraulic fluid, an outlet 23 for leakage of hydraulic fluid, and an orifice 24 serving as intake for measurement of the pressure of hydraulic fluid in the body of the jack. A piston ring 14 ensures sealing between the piston 21 and the body of the jack. Finally, a safety nut 13 is placed on the end of the rod 9 outside the closure plate 12 at a suitable distance from this safety nut; the aim of it is to avoid excessive slackening in the event of collapse of the oil pressure in the jack 20. In accordance with the invention heavier or less heavy tightening of the tie rod 19 is obtained by adjusting the pressure of hydraulic fluid led into the body of the jack 20 through the inlet 22.

FIG. 4 shows the devices for measurement and control associated with the eight jacks 20 in accordance with the invention. As may be seen in the drawing, a displacement pick-up 16 is associated with the upstream end of each rod 9, such as an eddy-current pick-up carried by the body 11 of the jack by means of a bracket 15. This pick-up 16 supplies an electrical signal which is admitted through a connection 25 into a force and pressure control cabinet 18 consisting of a computer of ordinary type. Furthermore a pressure pick-up 17 is connected to the pressure intake 24 and likewise supplies an electrical signal likewise admitted into the computer through a connection 26. The reference numbers 27 and 28 designate other inputs to the computer 18 proceeding from signals emitted by other jacks, and the reference numbers 29 and 30 designate the outputs of signals each indicating the hydraulic pressure to be applied to each jack as a function of the data supplied by the computer 18 in response to its input signals such as 25 and 26.

In operation the desired values relative to the different tightenings necessary in order to obtain optimum intensity of tightening and the balancing necessary for parallelism of the two retainer plates 7 and 2 are displayed in a conventional manner in the computer 18, and it consequently supplies as a function of any deviation in the displacement of one or more rods 9 the pressure control signals necessary for ensuring for the whole the predisplayed tensions.

The invention is made use of in the production of hydrogen and oxygen by electrolysis of water.

I claim:

1. In an electrolyzer of the type consisting of a stack of elemental electrolytic cells, said stack being held between two end plates connected by tie rods, the improvement wherein each of said tie rods includes a device for variable tightening which is remote-controlled and equipped with a device for measurement of said tightening, and in that the whole of the said devices are connected to a common force and position control cabinet.

2. An electrolyzer as in claim 1, wherein,
   said devices for variable tightening consist of jacks and in that the said measurement devices include pick-ups of displacement of the rods of the jacks and pressure pick-ups associated with the said jacks.

* * * * *